United States Patent Office 3,253,414
Patented May 31, 1966

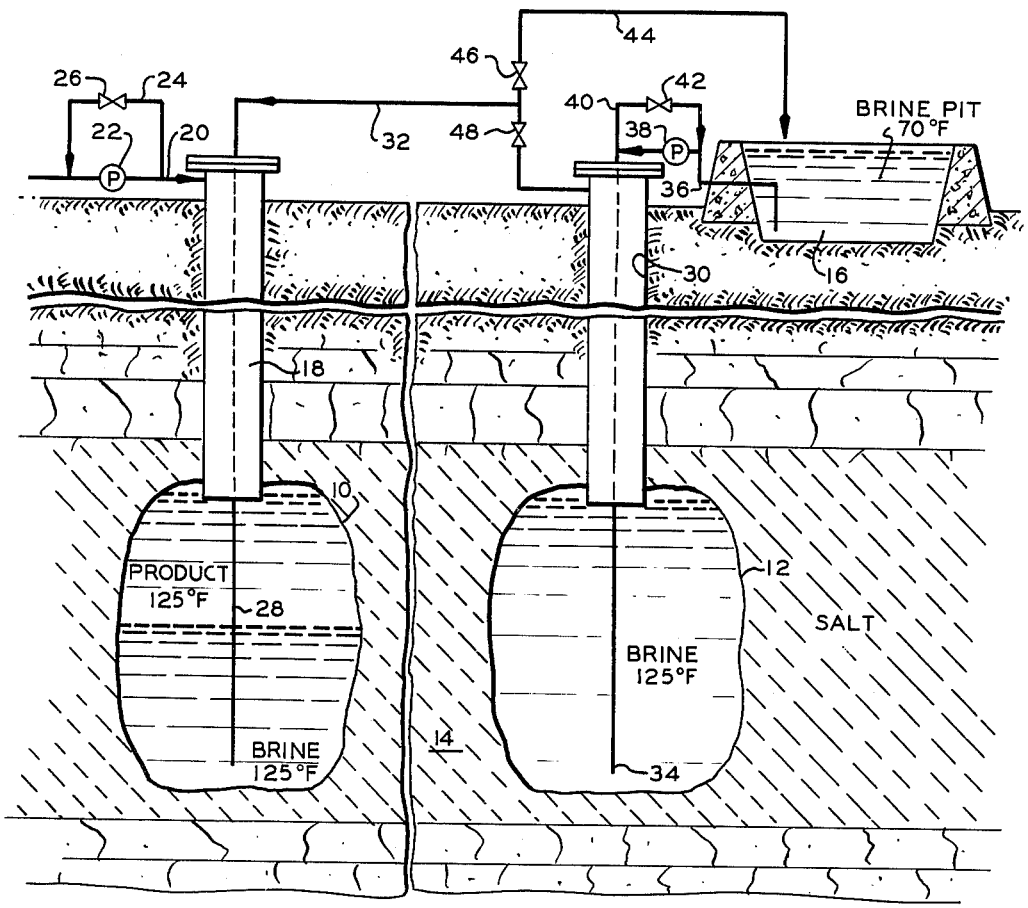

3,253,414
METHOD AND APPARATUS FOR OPERATING UNDERGROUND STORAGE CAVERNS
Lawrence G. Molique, Bartlesville, Okla., assignor to Phillips Petroleum Company, a corporation of Delaware
Filed July 6, 1962, Ser. No. 208,009
8 Claims. (Cl. 61—.5)

This invention relates to a method and apparatus for operating an underground storage cavern wherein the fluid being stored displaces and is displaced by brine upon storing and dispensing the fluid, respectively.

In recent years, the use of underground storage caverns has been widely adopted. These caverns are drilled, mined, dissolved, or otherwise formed within a subterranean stratum. A common method of forming such caverns comprises dissolving with water sufficient salt from a salt deposit to form a sizeable storage cavern. The well bored into the earth to produce the storage cavern in the salt bed is piped with at least one inlet pipe and an outlet pipe, one pipe end usually being located adjacent the top of the cavern for introduction and removal of stored fluid, and the other pipe end being located adjacent the bottom of the cavern for introduction and removal of the heavier liquid which liquid is usually saturated brine at the temperature and pressure of the cavern. Depending on the depth of the cavern and the material stored, the temperatures within the cavern may run as high as, e.g., several hundred degrees F., and the pressure is usually several hundred pounds per square inch. One typical storage cavern washed from a salt dome has a temperature of about 125 to 130° F. and, when storing propane liquid, the pressure runs about 400 to 500 p.s.i.

Conventional operations employ a surface storage pit (or pits) for the brine which is used as the displacing liquid. Ambient temperatures of the surface stored brine cause a drop-out of salt from the brine since the brine (which was removed from the cavern when the fluid to be stored in the cavern was introduced into the cavern) is saturated with salt, e.g., at 125° F., in the cavern, and upon cooling in the surface pit, the new saturation temperature is, e.g., 70° F. Approximately one pound of sodium chloride drops out of each twelve gallons of brine.

In one prior art practice, to prevent the drop-out of salt in the pits, the removed brine was diluted with water. Although this system of dilution solved the salt drop-out problem, it introduced a very major problem. That is, the relatively cool dilute brine pumped back into the cavern, being unsaturated with respect to salt at cavern temperature, became again saturated in the storage cavern. This "resaturation" resulted from the dilute brine dissolving additional salt from the cavern which enlarged the cavern. Also, without the prior art's dilution of the brine in prior art practice, the cooled brine from the surface pit, being saturated at the pit's temperature, upon re-entering the salt cavern also dissolved additional salt from the cavern, enlarging the cavern, the brine becoming again saturated at the higher temperature (and pressure) of the cavern. Thus each time brine is removed from the cavern to the pits, and then later introduced back into the cavern, the salt cavern is enlarged. Over a period of time this gradual enlargement of the storage cavern can have a very detrimental effect on the cavern. In some cases the salt at a locus is completely dissolved and leaks develop with resulting loss of stored fluid. In other cases, the cavern is too large for the quantity of material to be stored, adding considerably to the pumping and other handling costs.

This invention is concerned with a novel underground storage system and method of operation which eliminates or greatly minimizes enlargement of product storage caverns located in salt formations, using brine as the displacing liquid.

Acordingly, the principal object of the invention is to provide a storage system or arrangement of apparatus and a method of operation which substantially eliminates product storage cavern enlargement during use of the system. Another object is to provide a storage system and method of operation which prevents leaks in storage caverns in salt formations utilizing brine as the displacing fluid. A further object is to provide a simple and economical method of storing and dispensing fluids in and from a storage cavern in a salt formation. Other objects of the invention will become apparent to one skilled in the art upon consideration of the accompanying disclosure.

A broad aspect of the invention comprises utilizing a brine cavern, in addition to the product storage cavern, located in the salt deposit in the proximity of the storage cavern and at substantially the same level where the temperaure is the same as that in the storage cavern. A brine pit or reservoir is maintained at ground level and brine is forced from the reservoir into the brine cavern which is maintained full of brine so that brine is forced from the brine cavern into the lower section of the product storage cavern to displace stored fluid product from this cavern into the product take-off line. In this manner, the brine in the brine cavern is saturated at the temperature and pressure existing in the product storage cavern so that there is no dissolving of salt from the product storage cavern by the brine forced into same from the brine cavern. In the storage of additional fluid product in the storage cavern, brine is forced from this cavern into the brine reservoir either directly or thru the brine cavern. Brine is never introduced directly from the brine reservoir into the product storage cavern but always thru the brine cavern in which the temperature and pressure correspond to temperature and pressure in the storage cavern.

The brine cavern is kept full by use of brine makeup from the brine pit or reservoir. This reservoir brine will gradually cause an increase in size of the brine cavern but has no effect upon the storage cavern. In forming the brine cavern, allowance can be made for dissolution of salt without exceeding the limits of the salt deposit and such enlargement of the brine cavern is not so serious as enlargement of the storage cavern. One brine cavern and brine reservoir may be utilized in the operation of a plurality of storage caverns. A more complete understanding of the invention may be had by reference to the drawing, which is an elevation in partial section thru a storage system showing a preferred arrangement of apparatus in accordance with the invention.

Referring to the drawing a storage cavern 10 and a brine cavern 12 are formed in salt stratum 14. A brine pit or reservoir 16 is provided at ground level. Product conduit 18 extends to storage cavern 10 from ground level thru the well thru which the storage cavern was formed. Product line 20 having pump 22 therein connects with conduit 18. A by-pass line 24 containing valve 26 connects with product line 20 on opposite sides of pump 22.

Conduit 28 leads from the lower portion of storage cavern 10 thru conduit 18 to ground level and connects directly with conduit 30 (leading from ground level to the top section of brine cavern 12) by means of conduit 32. Conduit 34 extends from near the bottom of brine cavern 12 to ground level thru conduit 30 and connects with the brine pit 16 thru line 36. A pump 38 is provided in line 36 for forcing brine from reservoir 16 into brine cavern 12 and brine from cavern 12 to storage cavern 10 during dispensing of stored fluid. A bypass line 40 containing valve 42 connects with line 36 on each side of pump 38.

In order to provide for direct displacement of brine from product storage cavern 10 to brine reservoir 16, line 44 connects with line 32 and with brine reservoir 16. Valves 46 and 48 are positioned in lines 44 and 32, respectively, to provide for control of the flow of displaced brine into brine cavern 12 or brine reservoir 16, as desired.

In operation, assuming cavern temperature to be 125° F. and atmospheric temperature 70° F., when dispensing product:

(a) Brine at 125° F. from brine cavern 12 is displaced by brine at 70° F. from pit 16 by operation of pump 38, the brine passing thru conduits 36 and 34 to the bottom of cavern 12.

(b) This 125° F. brine from brine cavern 12 passes via conduits 30, 32, and 28 into the bottom of storage cavern 10 and displaces product thru conduit 18 and line 20, bypassing pump 12 by means of line 24.

When adding product to the cavern:

(a) Brine at 125° F. from product cavern 10 is displaced into brine cavern 12 thru conduits 28, 32, and 30 which displaces the lower level brine from cavern 12 via conduit 34, bypass line 40 and conduit 36 to brine reservoir 16; or (b) Brine from product cavern 10 can be passed directly to brine reservoir 16 via line 44 by closing valve 48 and opening valve 46.

In conventional practice wherein brine from the brine pit is utilized to displace product from the product cavern by direct injection of the brine thereto, approximately each 1650 gallons of 70° brine from the pit introduced to the product cavern dissolves one cubic foot of salt, thereby enlarging the product storage cavern. It can readily be seen that the millions of gallons of brine added and removed from the product storage cavern during the storing and dispensing of product over a period of time will cause a considerable enlargement of the product cavern. This invention substantially eliminates the problem of enlargement of the product storage cavern.

With the arrangement shown in the drawing, saturated brine at formation temperature and pressure is available in the upper section of cavern 12 for displacement of product from storage cavern 10. Reservoir brine (undersaturated at cavern temperature and pressure) is introduced to the lowermost section of brine cavern 12 where it has time to become saturated before reaching the top of this cavern. Thus, saturated brine at the conditions in storage cavern 10, is always available in brine cavern 12 for displacing purposes.

The method and apparatus of the invention are applicable to the storage of hydrocarbons and other fluids lighter than brine. Such hydrocarbons as ethylene, propylene, ethane, propane, butenes, butane, isobutane, natural gas liquids, etc., may be stored and dispensed by the method and system disclosed herein.

Certain modifications of the invention will become apparent to those skilled in the art and the illustrative details disclosed are not to be construed as imposing unnecessary limitations on the invention.

I claim:

1. In the storage of fluid lighter than brine over brine in a product storage cavern in a subterranean salt formation wherein said fluid displaces and is displaced by brine upon alternately storing and dispensing said fluid, respectively, and the temperature in said product cavern is substantially above atmospheric temperature, the method comprising the steps of (1) maintaining a separate brine cavern in said salt formation substantially full of saturated brine at formation temperature and connected by conduit with said product cavern; (2) maintaining a brine reservoir adjacent ground level connected by conduit with said brine cavern; (3) and dispensing stored fluid by displacing same from said product cavern by pumping brine from said brine reservoir into said brine cavern so as to force brine from said brine cavern at formation temperature into said product cavern to displace stored liquid therefrom thereby avoiding enlargement of said product cavern by dissolution of salt in the influent brine.

2. The method of claim 1 including the step of storing fluid, prior to and subsequent to dispensing fluid, by forcing same into said product cavern so as to displace brine therefrom and passing resulting displaced brine to said brine reservoir.

3. The method of claim 2 wherein the resulting displaced brine is forced into said brine cavern so as to displace brine therefrom into said reservoir.

4. The method of claim 2 wherein the resulting displaced brine is forced directly into said reservoir.

5. In the storage of fluid lighter than brine over brine in a product storage cavern in a subterranean salt formation wherein said fluid displaces and is displaced by brine upon alternately storing and dispensing said fluid, respectively, and the temperature in said product cavern is substantially above atmospheric temperature, the method comprising the steps (1) maintaining a separate brine cavern in said salt formation substantially full of saturated brine at formation temperature and connected by conduit with said product cavern; (2) maintaining a brine reservoir adjacent ground level connected by conduit with said brine cavern; (3) and storing said fluid in said storage cavern by pumping same into said storage cavern so as to displace brine therefrom into said brine cavern and brine from said brine cavern into said brine reservoir.

6. A fluid storage system comprising a subterrean product storage cavern in a salt formation, brine as displacing medium occupying the lower portion of said product cavern; a brine cavern in said salt formation completely filled with brine; a brine reservoir adjacent ground level containing brine; a product line extending from above ground into the top of said product cavern; means in said product line for forcing product into said product cavern; first brine-filled conduit means connecting the lower portion of said product cavern with said brine cavern; second brine-filled conduit means leading from said brine cavern to said brine reservoir; third brine-filled conduit means connecting said brine reservoir with the lower portion of said brine cavern; and means in said third brine-filled conduit means for forcing brine from said brine reservoir into said brine cavern.

7. A fluid storage system comprising a subterranean product storage cavern in a salt formation, saturated brine as displacing medium occupying the lower portion of said cavern; a brine cavern in said salt formation completely filled with saturated brine; first brine-filled conduit means passing to ground level and connecting the lower portion of said product cavern with the upper portion of said brine cavern; a brine reservoir adjacent ground level having saturated brine therein; second brine-filled conduit means connecting said brine reservoir with said brine cavern; a product line extending from above ground level to the upper portion of said product cavern for transferring product to and from said product cavern; means in said product line for forcing product into said cavern;

and means for forcing brine from said brine reservoir into said brine cavern.

8. The fluid storage system of claim 7 including a third conduit means connecting an intermediate section of said first conduit means with said brine reservoir; a valve in said third conduit means; and a valve in said first conduit means intermediate said intermediate section and said brine cavern.

References Cited by the Examiner

UNITED STATES PATENTS 2,934,904  5/1960  Hendrix _____ 61—.5

FOREIGN PATENTS 610,827  12/1960  Canada.

OTHER REFERENCES

Oil and Gas Journal, pages 117–120, April 10, 1961.

EARL J. WITMER, *Primary Examiner.*